Patented Jan. 12, 1937

2,067,586

UNITED STATES PATENT OFFICE 2,067,586

LIQUID COATING COMPOSITION

Watson H. Woodford, Bridgeport, Conn., assignor to Remington Arms Company, Inc., a corporation of Delaware No Drawing. Original application October 8, 1927, Serial No. 225,024. Divided and this application July 26, 1929, Serial No. 381,402

17 Claims. (Cl. 91—68)

This invention relates to lacquers or varnishes and especially to a composition which may be applied over a surface which is coated or contaminated with wax or grease, and adheres to and completely covers such a surface, and quickly dries thereon. This application is a division of my copending application Serial Number 225,024, filed October 8, 1927.

It is well known that ordinary varnishes and lacquers cannot be applied to surfaces upon which waxes, greases, or oils are present. The varnish or lacquer does not adhere to a greasy surface and special difficulties are encountered if a wax such as paraffin wax is present.

While a paraffin surface does not repel lacquer or varnish, the drying of the lacquer or varnish on such a surface is retarded indefinitely. If the surface dries at all, a soft paraffin finish and not a hard varnish finish is secured. It is thought that the reaction which occurs when a volatile solvent lacquer or varnish is applied over paraffin is analogous to the action of paint and varnish removers. Such removers consist essentially of a suspension of paraffin wax in acetone and/or benzine. When this fluid is spread upon a surface, the evaporation of a small amount of the solvent forms a continuous and impervious film of paraffin wax over the remaining solvent and prevents further evaporation. The solvent is thus enabled to penetrate and soften the paint or varnish to be removed.

Quick drying varnishes and lacquers use as solvents acetone, benzine, alcohol, and similar substances. It is thought that when such a varnish or lacquer is applied over paraffin, paraffin is dissolved in the solvent and quickly reaches the free surface where a film analogous to the paint remover film is formed and the drying of the varnish is thereby greatly retarded.

In certain industrial processes, for example, the manufacture of paper tubes for shot shell bodies, the use of paraffin impregnated paper is highly desirable on account of the capacity of paraffin for absorbing heat. Referring particularly to shot shells, when a shot shell is fired, a very large quantity of heat is generated within the shell by the combustion of the powder and momentarily a high temperature is reached. The temperature drops rapidly and probably within a few seconds has been reduced below the charring point of the cartridge paper from which the shot shells are made. However, it is manifestly very important that the paper be protected during the brief period of its exposure to intense heat, and paraffin has been quite universally used in the manufacture of shot shells as a heat absorbent and for other desirable properties. If the paper shot shell is well impregnated with paraffin, it does not reach a temperature at which an undesirable or dangerous amount of charring takes place.

However, it is also very desirable that shot shells be made impervious to moisture. While paraffin, itself, is somewhat moisture resistant, it is incapable of preventing the absorption by the paper of a sufficient amount of moisture to cause such swelling of shot shells as will render them useless. For this reason, methods for producing shot shells which are heat resistant and at the same time capable of receiving a coat of varnish have long been sought. The application of varnish to a paraffin impregnated paper has hitherto been considered impossible for the reasons above discussed.

It is an object of the present invention to provide a varnish which may be successfully applied to a surface contaminated with grease or wax.

A further object of the invention is to prepare a varnish or lacquer which can be successfully applied over a paraffin surface.

A further object of the invention is to provide a varnish or lacquer ingredient which greatly accelerates the drying of the varnish or lacquer upon a paraffin surface.

A further object of the invention is to provide a lacquer or varnish the drying of which is not retarded by the presence of paraffin.

A further object of the invention is to provide a lacquer or varnish ingredient which is effective to prevent the formation of an evaporation retarding paraffin film.

With these and other objects in view, the invention comprises the novel compositions and ingredients thereof which will be hereinafter more fully described.

It has been found as the result of extensive experiment that a metallic soap in varnish or lacquer reacts in such a way as to completely overcome the effect of paraffin wax in retarding drying. A metallic soap may thus be used in spirit varnish, pyroxylin lacquer, or pyroxylin resin lacquer with substantially the same result. All such varnishes and lacquers will for the purpose of this specification and the claims hereto appended, be termed "lacquer varnish". One method of securing a lacquer varnish of the desired properties comprises dissolving one or more metallic soaps in such solvents as the coal tar hydrocarbons, for example, toluene, benzene, benzol, or xylene. The solution of the metallic soap in the solvent is best accomplished at the boiling point of the solvent. Many soaps which appear to be quite insoluble in the cold solvent may be dissolved at the boiling point by continued operation of a reflux condenser, and, once dissolved, remain in solution in varying quantities after cooling. In general, the drying time of a lacquer varnish which contains metallic soap varies inversely as its soap content, but the presence of even a small amount of metallic soap enables a lacquer varnish to dry without blushing upon a paraffin surface in a comparatively short time. For example, a lacquer varnish containing about two-tenths of one percent of a difficultly soluble metallic soap will dry upon paraffin in an atmosphere of 50% relative humidity in about ten minutes. Among the metallic soaps which have been found most suitable on account of their solubility and their property of remaining in solution in a lacquer varnish are the oleates of aluminum, cobalt, copper, iron, magnesium, nickel, and lead; the stearates of aluminum, calcium, copper, and iron; the resinate of copper, and the palmitates of calcium, copper, manganese, and nickel. A solution of one or more of these metallic soaps in a suitable coal tar hydrocarbon such as toluene may be mixed with any desired lacquer varnish in varying proportions. For example, one metallic soap lacquer is made from a pyroxylin resin lacquer of the following composition.

|  | Percent |
| --- | --- |
| Castor oil | 4 |
| Butyl phthalate | 3 |
| Cumar resin | 4 |
| Ester resin | 6 |
| ½ sec. pyroxylin (dry wt.) | 7.7 |
| Alcohol | 3.3 |
| Butanol | 2 |
| Toluene | 20 |
| Benzol | 15 |
| Butyl acetate | 15 |
| Acetone | 20 |
|  | 100 |

To 75% of this lacquer is added 25% of a 2.5% solution of a metallic soap, say aluminum stearate, in toluene. When this lacquer is spread upon a paraffin surface in an atmosphere of 70% relative humidity, it dries completely in about four minutes. The drying is somewhat more rapid in an atmosphere of lower humidity. It is to be clearly understood that the above is merely typical of a large number of successful formulae. The properties of the different metallic soaps vary somewhat. Some of the oleates, for example, form rather soft films in the above lacquer, and the film may be hardened by reducing the lacquer plasticizing ingredients, or omitting them altogether. Again, the solid ingredients may be varied and one or more omitted. Similarly, the solvents may be varied, although it is considered advisable to maintain a large proportion of the solvents of the metallic soap, to favor the retention of the soap in solution. Likewise, although 1% to 4% solutions of the metallic soap have been found satisfactory, solutions of other concentration are also successful. Exhaustive experiments have shown that the action of metallic soaps is the same with any of the lacquer varnishes now sold commercially, as well as a great many others of which those herein mentioned may be considered as typical. The general, if not universal, effect of the presence of a metallic soap in any such lacquer varnish is to accelerate its drying on any surface, and particularly to enable it to dry on a paraffin surface. Moreover, a solution of a metallic soap in a coal tar hydrocarbon may itself be applied to and dried upon paraffin, and thereafter an ordinary lacquer varnish will dry upon the surface much the same as upon a clean and dry surface.

The reaction by which the presence of a metallic soap enables lacquer varnish to dry upon a paraffin or greasy surface is not at present fully understood, and although various theories might be advanced in explanation, it is obviously unnecessary to present them here.

Paper tubes and other paraffin impregnated articles coated with a metallic soap containing lacquer varnish have been immersed in water for long periods without showing any signs of moisture absorption.

The present applicant being the first to devise means of applying lacquer varnish as hereinbefore defined to a waxy or greasy surface, particularly one comprising paraffin wax, the appended claims are to be broadly constructed.

What is claimed is:

1. The method of waterproofing a paraffin surface which comprises the application to such surface of a fluid comprising a solution of a metallic soap in toluene.

2. The method of waterproofing a paraffin surface which comprises the application to such surface of a fluid comprising a solution of a metallic soap.

3. The method of waterproofing a paraffin surface which comprises the application to such surface of a fluid comprising a solution of from 1% to 4% of a metallic soap in a coal tar hydrocarbon.

4. The method of waterproofing waxy surfaces which comprises the application thereto of a varnish which contains a metallic soap.

5. In the manufacture of paper shot shells, the method which comprises impregnating the shells with paraffin for fireproofing, and coating the shells with a varnish containing a metallic soap for waterproofing.

6. The method of forming a continuous, dry, moisture-proof film upon a paraffin treated surface which comprises the application to said surface of a lacquer varnish comprising a film forming material, a solvent for said film forming material, and a solution of a metallic soap.

7. The method of forming a continuous, dry, moisture-proof film upon a paraffin treated surface which comprises the application to said surface of a lacquer varnish comprising a resin, a solvent therefor, and a solution of a metallic soap.

8. The method of forming a continuous, dry, moisture-proof film upon a paraffin treated surface which comprises the application to said surface of a lacquer varnish comprising pyroxylin, a solvent therefor, and a solution of a metallic soap.

9. The method of forming a continuous, dry, moisture-proof film upon a paraffin treated surface which comprises the application to said surface of a lacquer varnish comprising resin, pyroxylin, solvents therefor, and a solution of a metallic soap.

10. The method of forming a continuous, dry, moisture-proof film upon a paraffin treated surface which comprises the application to said surface of a lacquer varnish comprising cumar resin, ester resin, pyroxylin, solvents for said resin and pyroxylin, and a solution of a metallic soap.

11. The method of forming a continuous, dry, moisture-proof film upon a paraffin treated surface which comprises the application to said surface of a lacquer varnish comprising a film forming material, a solvent for said film forming material, and a solution of a metallic soap in a coal tar hydrocarbon.

12. The method of forming a continuous, dry, moisture-proof film upon a paraffin treated surface which comprises the application to said surface of a lacquer varnish comprising a film forming material, a solvent for said film forming material, and a solution of a metallic soap in toluene.

13. The method of forming a continuous, dry, moisture-proof film upon a paraffin treated surface which comprises the application to said surface of a lacquer varnish comprising a film forming material, a solvent for said film forming material, and a solution of aluminum stearate.

14. The method of forming a continuous, dry, moisture-proof film upon a paraffin treated surface which comprises the application to said surface of a lacquer varnish comprising a film forming material, a solvent for said film forming material, and a solution of aluminum stearate in toluene.

15. In the waterproofing of a paraffin surface, the method which comprises the application to such surface of a quick drying lacquer varnish containing a paraffin solvent and a solution of a metallic soap in a coal tar hydrocarbon.

16. A shot shell comprising a fibrous wax-impregnated body and a continuous, hard and impervious film of a lacquer varnish containing a metallic soap applied and adhering to said wax-impregnated body.

17. A shot shell comprising a wax-impregnated body and a surface finish of a lacquer varnish containing a metallic soap.

WATSON H. WOODFORD.